United States Patent [19]

Hanton

[11] 4,071,481

[45] Jan. 31, 1978

[54] MANUFACTURE OF PHENOLIC FOAM

[75] Inventor: Daniel Hanton, Estrees Saint Denis, France

[73] Assignee: Saint-Gobain Industries, Neuilly-sur-Seine, France

[21] Appl. No.: 594,956

[22] Filed: July 11, 1975

Related U.S. Application Data

[63] Continuation of Ser. No. 445,433, Feb. 25, 1974.

[51] Int. Cl.² .............................................. C08J 9/10
[52] U.S. Cl. .......................... 260/2.5 F; 260/2.5 B; 260/2.5 E; 260/57 R
[58] Field of Search ................... 260/2.5 F, 57 R

[56] References Cited

U.S. PATENT DOCUMENTS

| Re. 27,927 | 2/1974 | Jablonski | 260/2.5 B |
|---|---|---|---|
| 2,608,536 | 8/1952 | Sterling | 260/2.5 F |
| 2,629,698 | 2/1953 | Sterling | 260/2.5 F |
| 2,653,139 | 9/1953 | Sterling | 260/2.5 F |
| 2,728,741 | 12/1955 | Simon | 260/2.5 F |
| 2,797,443 | 7/1957 | Carlson, Jr. | 260/2.5 B |
| 2,857,341 | 10/1958 | Colwell et al. | 260/2.5 B |
| 2,933,461 | 4/1960 | Mullen | 260/2.5 F |
| 2,945,828 | 7/1960 | Henning | 260/2.5 B |
| 3,267,048 | 8/1966 | Horste et al. | 260/2.5 F |
| 3,271,331 | 9/1966 | Ender | 260/2.5 F |
| 3,300,419 | 1/1967 | Erickson | 260/2.5 F |

FOREIGN PATENT DOCUMENTS

| 244,592 | 1/1966 | Austria | 260/60 |
|---|---|---|---|
| 1,319,889 | 1/1963 | France | 260/2.5 F |
| 1,339,019 | 8/1963 | France | 260/2.5 F |

OTHER PUBLICATIONS

"Phenolic Resins," by Whitehouse et al., pp. 120, 123 and 124, London 1967.

*Primary Examiner*—Morton Foelak
*Attorney, Agent, or Firm*—John T. Synnestvedt

[57] ABSTRACT

Phenolic foams, mixtures for producing phenolic foams, and processes of manufacturing phenolic foams are disclosed. The resin utilized is a base catalyzed polycondensation product of phenol and formaldehyde which is obtained in a solid, reactive, fusible, substantially anhydrous state. The resin is foamed and hardened by the application of heat without the use of a catalyst. Heat sensitive blowing agents, either in liquid form or in particulate form may be mixed with the resin prior to heating. Surfactants and lubricants may be utilized to enhance the uniformity of the voids in the foam. The resulting foams are non-acidic, are resistant to color changes, and are substantially anhydrous.

36 Claims, No Drawings

MANUFACTURE OF PHENOLIC FOAM

This is a continuation of application Ser. No. 445,433, filed Feb. 25, 1974.

FIELD OF THE INVENTION

The present invention is concerned with the production of foams and foam articles from phenoplast resins of the resol type obtained by the condensation of phenol or one of its derivatives with formaldehyde. "Phenoplasts" are the condensation products of formaldehyde with phenol.

DESCRIPTION OF THE PRIOR ART

Phenolic foams have, of course, previously been known. However, in the processes of prior art, catalysts are commonly used for expanding and setting the resin. Because of the use of these catalysts, the resin foams formed contain a residual acid. The presence of the residual acid is undesirable for several reasons. When such foams are used in direct contact with metal parts, such as steel and aluminum, the residual acid in the foam reacts chemically with the metal, causing corrosion. Heretofore, various attempts have been made to make structural building elements from such metallic-foam laminates. However, because of the problems arising from the presence of the residual acid in the foam, the results have been less than satisfactory.

In addition, the presence of the residual acid in the foam, depending on the acid, may tend to cause the foam to change color, for example, to turn an unattractive brownish-violet. This can occur in these foams even when the foam has not been in contact with a metal.

Also, phenolic resin foams produced by known processes contain a relatively high proportion of water. In order to dry these foams, it is necessary to heat them to expel the water in vapor form through the membranes of the cells. If heating takes place quickly and at high temperatures, it results in bursting of the cells. This causes the structural continuity of the foam to be destroyed, which results in a degradation of the mechanical properties of the foam. If a low temperature is used, the drying time required becomes prohibitive and it may take several days to complete the drying process.

SUMMARY OF THE INVENTION

Accordingly, it is an important object of the invention disclosed herein to produce phenolic foams which are nonacidic.

It is also an object of this invention to produce a phenolic foam which can be used in direct contact with metal without corrosion of the metal occurring.

It is an additional object of this invention to provide phenolic foams which do not discolor.

It is also an object of this invention to provide, without the need for any intermediate step and without a time delay, phenolic resin foam which is substantially anhydrous.

It is also an object of this invention to provide a process for producing phenolic foam in which a catalyst has not been used for expanding or setting the foam.

Briefly, the process according to the invention herein described comprises utilizing a reactive, fusible, substantially anhydrous phenolic resin of the resol type obtained by condensing a phenol with formaldehyde in aqueous solution in the presence of a basic condensation catalyst and suspending and stabilizing the condensation product. The resin may be mixed with a blowing agent, a surfactant, and a lubricant. The mixture may be placed in a mold or extruded. The mold or extrudate is heated and the resin is caused to foam under the influence of heat alone, without a catalyst.

DESCRIPTION OF THE INVENTION

According to the invention herein disclosed, the phenolic resin of the resol type —in the solid state, reactive and fusible— which is used in the process, is obtained by the condensation of 1.2 to 3.1 moles of formaldehyde with 1 mole of phenol, the polycondensation catalyst being an alkaline catalyst.

This initial resin is preferably prepared according to the processes which are disclosed in copending application Ser. No. 397,953, filed Sept. 17, 1973, which is a continuation of application Ser. No. 161,895 filed July 12, 1971, now abandoned, the disclosures of which are hereby incorporated by reference. The resin obtained by those processes is in the form of reactive, fusible beads. The process according to the present invention utilizes these beads or powders produced from these beads.

The resin beads obtained in the aforenoted process contain substantially no water, and specifically not more than 2% by weight of water. As a result, the foams or products formed from such foams do not require drying.

Foams may be produced from the above noted phenoplast resin without any additional blowing agent, simply by heating the resin, either in the form of beads or powder obtained from these beads, in a mold placed in an oven at a temperature higher than 100° C. In this case, the particles melt and then coalesce, producing a viscous paste which expands gradually and fills the mold. However, this procedure tends to produce foams of a very heterogeneous and uncontrollable density. The dimension of the pores in the foam varies greatly throughout the foam. As a result, the thermal conductivity of the foams produced according to the process just described is relatively high and the mechanical properties are rather unsatisfactory.

Thus, it is desirable to add a blowing agent to the resin prior to the expansion and hardening of the foam. The proportion of blowing agent used generally varies between 0.5 and 5% by weight of resin according to the type of blowing agent used and according to the desired density of the foam.

Organic liquids compatible with the above described phenoplast resins, which liquids are capable of vaporizing at temperatures generally ranging between approximately 100° and 170° C, and preferably between 120° and 150° C, can be used as blowing agents. Organic liquids which are especially useful for this purpose are the alcohols and the ketones, in particular the following alcohols and ketones:

|  | Boiling Point ° C |
|---|---|
| pentanol-1 | 138 |
| pentanol-2 | 119 |
| pentanol-3 | 115 |
| 3-methyl butanol-1 | 130 |
| hexanol-1 | 157 |
| hexanol-2 | 140 |
| 2-methyl hexanol-2 | 139 |
| heptanol-2 | 160 |
| 2-methyl butanol-2 | 114 |
| pentanone-2 | 101 |
| 2,4-dimethyl pentanone-3 | 123.7 |

|                    | Boiling Point ° C |
|--------------------|-------------------|
| hexanone-5 methyl  | 144               |
| heptanone-3        | 148.5             |
| 4-methyl pentanone-2 | 119             |

Also nitrogenized and/or sulfurized solids, generally those containing azo or nitroso groups or sulfonylhydrazide, and capable of releasing nitrogen at temperatures greater than 100° C, can also be used as blowing agents. Compounds of this type which have been found applicable to the process according to the present invention are: dinitrosopentamethylen tetramine; azoisobutyrodinitrile; azo 1,1′cyano 1-cyclohexane; benzenesulfonylhydrazide; azodicarbonamide; p,p′-oxy bis (benzenesulfonyl) hydrazide; di-isopropyl azodicarboxylate; morpholyl-5 thio-1,2,3,4 triazole, and similar compounds. It has been observed that particularly advantageous results are obtained by using blowing agents in the solid form, and more particularly in the form of powder.

In addition, it is advantageous to add surfactants to the mixture of resin and blowing agent prior to expansion of the resin, to assure a greater regularity of the foam expansion. It is believed this result is achieved because the surfactants help form a more homogeneous mixture of the resin and the blowing agent. The surfactants which have been used contain molecules comprised of chains of polyoxyalkylenes, which are soluble in water, in combination with aliphatic or organosilicic chains, which are insoluble in water. Examples of products suitable for this purpose are: polyoxyethylsorbitol laurate, nonylphenolpolyoxyethylene, or preferably the silicone oils of the copolymer type arranged in sequence with dialkylsilicones and alkylene oxides. The surfactants can comprise 0.1 to 5%, and preferably 0.2 to 2%, by weight of the resin.

In addition, it may be advantageous in certain instances to add lubricants to the resin mixture. For example, stearic acid, stearates of heavy metals (for example, zinc stearate), and long-chain fatty acid amides may be used. The lubricants can comprise 0 to 5%, and preferably form 0.5 to 2%, by weight of the resin.

Methods for carrying out the process according to the invention are given below. It is an important aspect of the process to assure that the resin is mixed with the blowing agent and other additives to obtain a uniform distribution of the blowing agent and of the other additives in the resin in order to obtain high quality products.

In one mixing process, a sealed revolving mixer is used, such as a rotating drum, a Y mixer, or the like, to which the resin is added in the form of beads, or in the form of powder, along with the additives. Mixing takes place at room temperature.

In another mixing process, the resin and additives are mixed under the same conditions as above, in a countercurrent mixer of the so-called "Ribbon-Blender" type.

In another mixing process, the resin and the additives are simultaneously crushed at room temperature, the mixture being obtained in the form of a powder. In this process a crusher of the hammer type having means for cooling the crusher may be employed.

In another mixing process, the resin is fused in a heated mixer having revolving arms, such as, for example, a Werner dual-bladed Z mixer, and the necessary additives are added to the molten resinous mass. The process then proceeds at temperatures of approximately 50 to 80° C. A mixture is obtained having the form of a viscous, homogeneous mass. The viscous mass may be expanded and set after shaping, for example in an extrusion process, or may be cooled and crushed, thereby forming a molding powder which can be subsequently expanded into foam. The resulting product may be kept for several weeks in solid or crushed form, prior to expansion into foam, without losing its properties.

In yet another mixing process, a fast Henschel or Papenmaier mixer may be used, for example, one having a vertical shaft supporting an agitator with blades turning in a cylindrical vat, which vat may or may not be provided with a double lining. Mixers of this type are commonly used for making powdered thermoplastic resins more dense. The resins, in the form of beads, is loaded into the vat and the agitator is turned on. Then the desired additive or additives are added while agitating. Agitation may then be stopped and additional pulverized additives may be added, whereupon agitation is resumed. The mixing operation takes place at a temperature of approximately 15° to 35° C and lasts for a total duration of several minutes. A mixture is obtained comprised of beads of resin uniformly coated with the blowing agent and such other additives as are used.

Particularly good results are obtained when the additives are stirred into the molten resin, as occurs when the molding compound is produced in a heated Werner type mixer, as heretofore described.

The mixtures obtained by the foregoing mixing processes are then expanded by heating. This operation may take place in molds or by extrusion, the extruded product being heated, for example, as it travels on a conveyer.

In the case of molding, the mixture is placed, in the form of powder, strips, or plates, into molds which are heated to a temperature of from 120° to 200° C in an oven or into molds which contain means, such as electric resistance elements or passages for the circulation of a heating agent, for uniformly heating the mold.

In the case of extrusion, the mixture is fed continuously through an extruder, and is formed into a strip or other shape which is carried by means of a conveyor belt into an oven, where expansion takes place. The process makes it possible to obtain an expanded product that can be cut as it leaves the oven into sections of the desired length. In this manner, it is possible to produce foams of various cross sectional configurations. For example, shells and half-shells usable as insulation for pipes may be produced.

The extruder may be of the single screw or double screw type, or of the turning plate type (Weissenberg action), with extrusion through the center of the fixed plate.

Particularly interesting results have been obtained by using —as an extrusion device — a dual movement apparatus, one movement comprised of intermittant rotation of the screw on a fixed cycle and the other movement comprised of a cyclical translational movement of the screw in a direction parallel to its longitudinal axis. Devices of this type are made up of an outer cylindrical body having internal spiral blades and a shaft having spiral blades disposed within the cylindrical body. Examples of such devices are the so-called Buss extruders. The importance of this type of device is that it enables, in the hot molten state, the homogenization of a resin and additive mixture obtained from another type of mixer, while simultaneously permitting extrusion through a die.

The extruded product may be shaped into a strip by means of a suitable die, placed at the outlet of the extruder or the Buss-type apparatus. It is possible to extrude one or, simultaneously, several strips, which are passed through one or more pairs of cooled rollers.

After the strips of resin material are extruded, the strips are heated, for example, in an oven. The oven may be equipped with a horizontal conveyer belt, which supports the strip or strips of material undergoing expansion. This oven may also be equipped with another belt, positioned above and parallel to the lower conveyer belt. The purpose of the second belt is to hold the foam at a fixed height during expansion. Thus panels of expanded foam having a constant thickness are obtained at the outlet of the oven. Endless belts may also be positioned vertically in the oven, their vertical faces being parallel to each other, and the direction of movement of such belts being parallel to the direction of movement of the conveyer belt. When such vertically positioned belts are used, the panels are given a parallelipiped shape.

An important characteristic of the present invention is the formation of new intermediate products, which may be easily stored and which permit phenolic resin foams of the resol type to be obtained under particularly advantageous and easy conditions.

In particular, the invention makes it possible to obtain, in the form of a new intermediate industrial product, a phenolic resin mass of the resol type, which is solid, reactive, and fusible, and in which a blowing agent is distributed in uniform fashion, which mass is capable of expanding and setting or hardening under the effect of heat alone. This particular mass may advantageously be comprised of phenolic resin beads covered with a coating made up of a blowing agent and also, if desired, a surfactant and a lubricant.

The invention also provides for the formation —in the form of a new intermediate industrial product— of a solid mass of phenolic resin of the reactive and fusible resol type, in which a blowing agent is distributed in a very uniform and homogeneous manner —the latter mass being stable and capable of expanding and setting under the effect of heat alone.

Also in accordance with the invention, provision is made for the preparation of such products having surfactants and lubricants uniformly and homogeneously distributed throughout the mass of resin material.

It has also been observed that it is particularly advantageous to use a blowing agent in powdered form for obtaining these intermediate products.

Examples of processes according to the invention are given below.

In all of these examples, the initial resins are obtained in the following manner:

The following products are successively added at 45°–50° C and at 95 rpm to a 20 liter stainless steel reactor, equipped with a blade agitator of the "Impeller" type, with a counter-blade, and with an agitation-speed control: 6266 grams of phenol, 109 grams of hydrated hydrazine, 7900 grams of formaldehyde in solution at 36% by weight and 3320 grams of water (all types of water may be suitable: distilled, decationized, doubly deionized, and water which has not been treated but simply filtered).

After having heated the reacting mixture to 60° C, 666 grams of ammonia solution with 30% $NH_3$ is added.

The temperature is raised and stabilized at 80° C. Then 20 grams of Tylose C300 (carboxymethylcellulose of Hoechst) and 15 grams of Nacconol 90 F (sodium dodecylbenzenesulfonate of Allied Chemical) are added in order to stabilize the suspension. After three hours of polycondensation, the mixture is cooled to room temperature, removing 7500 grams of a resin that is washed with water, passed through a centrifugal drier, and dried in an air circulation oven at 40° C. This resin is in the form of spheroids with a Gaussian particle size average of 0.8 mm in diameter, and ranging between 0.3 and 1.2 mm.

EXAMPLE 1

Heating of resin and liquid blowing agent

To 200 grams of the resin beads obtained in the manner set forth above, 6 grams of n-amyl alcohol was added. The resulting mixture was fused at 50° C for five minutes in a dual-bladed Z mixer, one of the blades of which turns at 23 rpm, and the other at 40 rpm. The molten paste obtained was pressed into a strip 7 mm thick. This strip was placed in a parallelepiped mold measuring 30 × 30 × 10 cm, and then the mold was heated in an oven at 140° C for 30 minutes, or at 160° C for 20 minutes, or at 130° C for 40 minutes.

A cellular body having an average density of 100 $kg/m^3$ was obtained, which was made up of communicating cells having diameters ranging between 1 and 30 mm.

EXAMPLE 2

Heating of resin and powdered blowing agent

Example 1 is reproduced, except that the n-amyl alcohol was replaced by 6 grams of azo-1, 1'cyano-1-cyclohexane in powder form. After heating for 30 minutes in a mold at 140° C, a cellular body was obtained with cells having an average diameter of 0.1 to 3 mm, with a core density of about 40 $kg/m^3$. With this procedure, heterogeneous zones having a cellular structure with a diameter greater than 3 mm sometimes occurred.

EXAMPLE 3

Mixing in a drum with powdered blowing agent and surfactant 1,000 grams of the resin in beads were added to a five liter cylindrical container. With the container rotating, 30 grams of azo-1,1'cyano-1-cyclohexane in powder form were gradually added, and then 5 grams of a silicone oil (L 5340 of Union Carbide) were added. The cylindrical container was rotated at 60 rpm for an additional 15 minutes at 20° C.

The mixed composition obtained was recovered and placed in a parallelepiped mold. The mixture was heated for 30 minutes at 140° C. A foam of 38 $kg/m^3$ was obtained, mostly made up of fine cells measuring 0.1 to 2 mm in diameter, with a certain number of cells elongated in the direction of expansion, measuring from 3 to 7 mm in diameter.

EXAMPLE 4

Mixing by fusion in a Werner mixer with powdered blowing agent and surfactant

The following products were successively added to a mixer with Z-type blades: 400 grams of the resin in beads, 12 grams of azo-1,1'-cyano-1-cyclohexane in powdered form, and 2 grams of L 5340 silicone oil of Union Carbide. The mixture was fused into a continuous mass at 70° C in six minutes. This mass was recovered and pressed into a strip 3 mm in thickness, after which it was transferred into a mold and heated to 140° C for 30 minutes. At the end of this period of time, a very regular, homogeneous foam was obtained, with cell diameters ranging between 0.2 and 2 mm. The core density was 35 kg/m$^3$. This foam had a crushing strength of 1.0 bar at 5% crushing according to NF T 56,101. It was self-extinguishing according to ASTM standard D 1692-68 (burning extent = 0). The coefficient of thermal conductivity was 0.030 Kcal. (m.h. at 23.9° C (mean temperature).

EXAMPLE 5

Rapid mixer + screw-type extruder 4,000 grams of resin in beads as mentioned above, 20 grams of L 5340 Union Carbide silicone oil, and 120 grams of azo-1,1'-cyano-1-cyclohexane in powdered form was added to a ten liter rapid Diosna mixer. The mixer was brought to room temperature for three minutes. The homogeneous mixture obtained was transferred into the hopper of a single-screw Gottfert extruder with a constant pitch screw of 20 mm diameter and a length to diameter ratio of 18. The temperature in the three zones of the casing was adjusted to 90° C. Extrusion was carried out at 1 kg/hr through a rectangular die measuring 18 × 10 mm maintained at 90° C. The mixture was then pressed between two rollers cooled by water at 20° C into a strip 3 mm thick, and this strip was transferred in continuous fashion onto a conveyor belt of a tunnel furnace. After 30 minutes at 150° C, a foam was obtained having characteristics identical to those in Example 4.

EXAMPLE 6

Rapid mixer + malaxator of the Buss type

The procedure was the same as in Example 5 for treatment with a rapid mixer.

The mixed composition was fed into the hopper of a dual-movement malaxator of the Buss PR 46 type. Mixing was carried out after adjusting the temperature in the three zones of the screw and the temperature of the malaxating body to 65°–70° C. Extrusion was carried out through a round die maintained at 80° C, and measuring 15 mm in diameter, with a flow of 17 kg/hr. The strip thus obtained was passed between two rollers cooled by means of water at 20° C, and was then transferred to a conveyor belt. The 4 mm thick strip thus obtained was introduced into a tunnel furnace, where expansion and setting of the foam took place. In this manner, a continuous strip of foam was obtained after 20 minutes at 150° C in the tunnel furnace. The foam had the same characteristics as that in Example 4. It may be cut up into panels used for heat-insulation in buildings, and particularly for insulating roofs made of steel. As the foam is neutral and non-corrosive, no corrosion is formed on the steel.

Furthermore, testing showed that 5 grams of the foam which has been cooled upon leaving the machine and pulverized, added to 45 grams of doubly deionized water in equilibrium with the carbon dioxide in the air, causes the pH of this water to increase from 5.96 to 6.10.

EXAMPLE 7

Mixture of powders - forming in mold

The following products were added at room temperature to a FORPLEX-type hammer crusher : 100 grams of the resin in beads, 0.5 grams of L 5340 silicone oil, and 3 grams of benzene sulfonylhydrazide in powder form. After three minutes, a powder comprised of particles having an average diameter of approximately 200 microns was obtained. In one instance this powder was taken immediately, and placed in a mold heated to 150° C for 20 minutes. In another instance, this powder was taken eight days after formation in the crusher and similarly placed in a mold and heated to 150° C for 20 minutes. In both instances, a foam having a core density of 30 kg/m$^3$ was obtained, having a fine and regular cellular structure, with cells measuring approximately 1 to 3 mm in diameter. The crushing strength at 3.8% crushing according to NF T 56,101 was 1.75 bars.

EXAMPLE 8

Mixture of powders — extrusion

A powder obtained from the crusher as in Example 7 was fed into a single-screw Gottfert extruder, as in Example 5. The temperature in the three zones of the casing was adjusted to 90° C, and extrusion was carried out at the rate of 1 kg/hr. The extrudate was then pressed between two rollers cooled by water at 20° C into the form of a strip 3 mm thick, and this strip was transferred continuously to the conveyer belt of a tunnel furnace. After heating for 30 minutes at 150° C, a foam was obtained having characteristics identical to those in Example 7.

EXAMPLE 9

Mixture of powders — direct heating

A powder obtained from the crusher as in Example 7 was transferred in a continuous manner to the conveyer belt mentioned in Example 8. The foam produced had the same properties as described in Example 7.

I claim:

1. A foamable phenolic resin mixture stable at room temperature from which cured and set foamed articles may be formed by heating alone in the absence of the addition of an agent for setting the resin, comprising a solid, reactive, heat-fusible water-insoluble phenolic resol resin of the resol type in particulate form, a blowing agent, and a surfactant, said mixture being devoid of any agent for setting the resin.

2. A mixture as in claim 1 wherein the blowing agent is a liquid that vaporizes above 100° C.

3. A mixture as in claim 2 wherein the blowing agent is an alcohol.

4. A mixture as in claim 3 wherein the alcohol is of the group consisting of pentanol-1, pentanol-2, pentanol-3, 3-methyl butanol-1, hexanol-1, hexanol-2, 2-methyl hexanol-2, heptanol-2, 2-methyl butanol-2.

5. A mixture as in claim 2 wherein the blowing agent is a ketone.

6. A mixture as in claim 5 wherein the ketone is of the group consisting of pentanone-2, 2, 4-dimethyl pentanone-3, hexanone-5 methyl, heptanone-3, or 4-methyl pentanone-2.

7. A mixture as in claim 1 wherein the blowing agent is a solid in a particulate state which releases nitrogen at temperatures greater than 100° C.

8. A mixture as in claim 7 wherein the blowing agent releases nitrogen and is of the group comprising nitrogenized or sulfurized solids having azo or nitroso groups and sulfonylhydrazide.

9. A mixture as in claim 8 which further comprises a lubricant.

10. A mixture as in claim 1 wherein the surfactant comprises a compound including a polyoxyalkylene chain and an aliphatic or organosilicic chain.

11. A mixture as in claim 10 wherein the surfactant is of the group consisting of polyethylsorbitol laurate, nonylphenolpolyoxyethylene, and copolymeric silicone oils of diakylsilicones and alkylene oxides.

12. A mixture as in claim 1 and further comprising a lubricant uniformly distributed throughout the resin.

13. A mixture as in claim 12 wherein the lubricant is of the group consisting of stearic acid, stearates of heavy metals, and fatty acid amides.

14. A mixture as in claim 1 wherein the resin is in the form of beads, the beads being coated with the blowing agent and the surfactant.

15. A mixture as in claim 14 wherein the coating on the resin beads further includes a lubricant.

16. The composition as in claim 1 wherein the blowing agent is present in the ratio of about 0.5 to 5% by weight of the resin.

17. The composition as in claim 1 wherein the surfactant is present in the ratio of about 0.2 to 2% by weight of the resin.

18. The composition as in claim 9 wherein the lubricant is present in the ratio of about 0.5 to 2% by weight of resin.

19. A process for producing an intermediate phenolic resin product expandable upon the application of heat alone in the absence of an agent for setting the resin, comprising
forming a solid, heat-fusible, reactive, water-insoluble phenolic resol resin in a particulate and substantially anhydrous state by the condensation of from 1 to 3.1 moles of an aldehyde with one mole of a phenol in the presence of a basic catalyst, a fusibility agent, a dispersant and a protective colloid,
drying said particulate phenolic resin,
and thereafter uniformly mixing a blowing agent with the phenolic resin particles, said expandable product being produced in the absence of any agent for setting the resin.

20. A process as in claim 19 which further comprises adding a surfactant to the particulate resin.

21. A process as in claim 19 which further comprises adding a lubricant to the particulate resin.

22. A process as in claim 21 wherein the particulate resin, the blowing agent, surfactant and lubricant are simultaneously mixed together.

23. A process as in claim 19 wherein the resin and blowing agent are mixed at approximately 50° to 80° C.

24. A process as in claim 23 wherein the mixture is brought to a temperature of between about 65° to 90° C.

25. A process as in claim 22 wherein the phenolic resin is in the form of beads.

26. A process as in claim 22 wherein the phenolic resin is in the form of powder.

27. A process as in claim 19 wherein the blowing agent is a solid in particulate form.

28. A process as in claim 19 wherein the blowing agent is in liquid form.

29. A process for producing a foamable article comprising,
mixing a fusible, reactive, particulate, phenolic resin of the resol type and a blowing agent, and shaping the mixture to a desired shape in the absence of any agent for setting the resin.

30. A process as in claim 29 wherein the shaping step includes extruding the mixture of resin and blowing agent.

31. A process as in claim 30 wherein the extruded mixture of resin and blowing agent is pressed between cooled rollers.

32. A process as in claim 31 wherein the extruded and pressed resin is heated in an oven to expand and set the resin in the absence of an agent for setting the resin.

33. A process as in claim 31 wherein the phenolic resin is introduced into a mold and the mold is subsequently heated to expand and set the resin in the absence of an agent for setting the resin.

34. An intermediate foamable product, stable at room temperatures, of phenolic resin, from which foamed articles can be formed by heating alone in the absence of an agent for setting the resin, comprising a shaped mass of a solid, reactive, heat-fusible, water-insoluble phenolic resol resin, a blowing agent and a surfactant dispersed throughout the resin, said product being devoid of any agent for setting the resin.

35. A product as in claim 34 wherein the mass is in the form of an extruded strip.

36. A product as in claim 34 wherein the mass is in the form of a pressed strip.

* * * * *

UNITED STATES PATENT AND TRADEMARK OFFICE
CERTIFICATE OF CORRECTION

PATENT NO. : 4,071,481
DATED : January 31, 1978
INVENTOR(S) : Daniel Hanton

It is certified that error appears in the above-identified patent and that said Letters Patent are hereby corrected as shown below:

Column 3, line 13 - "dinitrosopentamethylen tetramine;" should read --dinitrosopentamethylene-tetramine;--.

Column 7, lines 13 & 14, "(m.h. at 23.9°C" should read --(m.h.0° C.m$^2$)--.

Column 8, line 49, delete "of the resol type";

line 67, "nitrogen" should read --gas--.

Signed and Sealed this

Twenty-fifth Day of March 1980

[SEAL]

Attest:

SIDNEY A. DIAMOND

Attesting Officer

Commissioner of Patents and Trademarks